W. E. HARRIS.
SHEARS.
APPLICATION FILED MAY 28, 1914.
1,151,874.
Patented Aug. 31, 1915.
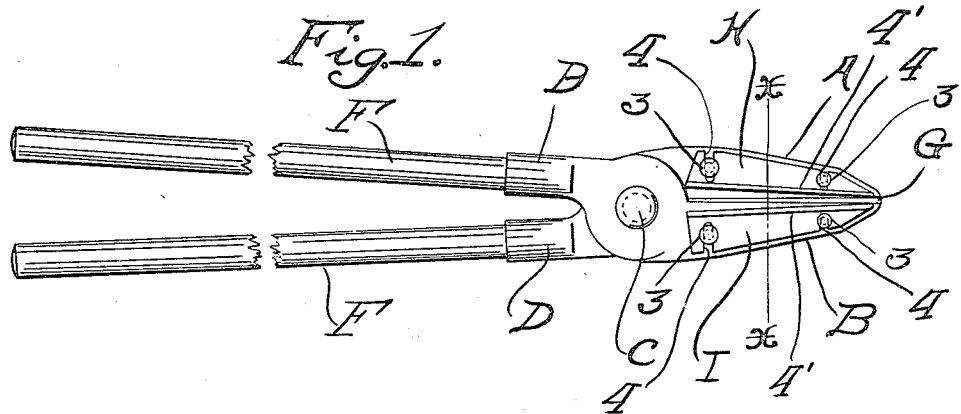
Witnesses:
Inventor:
William E. Harris
by: Bradbury
Attorney.

UNITED STATES PATENT OFFICE.

WILLIAM E. HARRIS, OF MINNEAPOLIS, MINNESOTA.

SHEARS.

1,151,874.  Specification of Letters Patent.  Patented Aug. 31, 1915.

Application filed May 28, 1914. Serial No. 841,487.

*To all whom it may concern:*

Be it known that I, WILLIAM E. HARRIS, a citizen of the United States, residing at Minneapolis, in the county of Hennepin and State of Minnesota, have invented a new and useful Improvement in Shears, of which the following is a specification.

The primary object of this invention is to provide a simple and inexpensive pair of shears, which may be used for cutting briers or other growing plants without the part which is cut away coming into contact with the hands or body of the user, in order that it may be laid aside in any desired position. The improvement further obviates the use of any spring parts, which are liable to be strained or bent when used, the blades being provided with detachable rigid elements, which are adapted to firmly hold the portion of the plant cut away until the blades of the shears have been opened. A device of this kind is adapted to save labor and to provide a convenient form of cutter for brier and other plants, without any likelihood of thorns sticking or scratching the hands or body of the user.

In the accompanying drawing forming part of this specification, Figure 1 is a top plan view showing the shears closed and a portion of the handles broken away; Fig. 2 is a side elevation, a portion of the handles being broken away, and Fig. 3 is a section on the line X—X of Fig. 1.

In the drawing, A and B indicate the cutting blades of my improved shears, said shears being in the form of flat blades of sufficient width to form a support for the butt of the plant severed from the root portion. Said blades are pivotally mounted together upon the pivot C, and each blade is formed with a socket such as D, in which a handle F is inserted. The handles in the two sockets are positioned adjacent each other, so that the shears can be opened and closed in the usual manner. The shear blades A and B are provided with the usual cutting edges G, which are adapted to coincide for cutting purposes. The construction described is all of usual form and may be substituted by any ordinary form of shears adapted for use by hand or other power. Mounted upon the flat surfaces of the blades A and B are two auxiliary jaws H and I of similar construction. Each of said jaws consists of an angle plate, one side 2 of which is detachably secured to the surface of one of the blades A or B by screws 3 passing through open ended slots 4 which extend laterally through the part 2. Extending upwardly and inclining inwardly from the part 2 is the side 4' of the angle plate which tapers in thickness toward its upper edge. The sides 4' of the jaw members are placed with their inner faces lying adjacent and converging outwardly toward the outer extremities of the cutting blades A and B, so that the distance between the inner faces of the upwardly and inwardly slanting sides 4' gradually diminishes from the portion of the blades nearest the pivot C to the points of the blades. This converging of the jaw faces enables the blades to cut stalks of various diameters and hold the cutaway portions securely with their butts resting on the blades. The inward and upward slanting of the faces of the jaws also causes the jaws to more tightly grasp or impinge the cutaway portion of the stalk than if the adjacent faces were to lie parallel in an upward direction. The jaw members described may be easily attached to or detached from the blades by tightening or loosening the screws 3.

In use the handle levers F—F are opened apart to spread the cutting blades and jaw members and the blades adjusted to the plant with the portion to be cut between the cutting edges. The handles F—F are next brought together, thus cutting off the plant as close to the ground as desired, the jaws H and I simultaneously closing upon the stalk of the cutaway portion and holding it tightly, so that the stalk can be carried by the jaws until the handles F—F are spread apart and the blades opened to release the stalk from the jaws. The leverage produced by the jaws is such as to enable the cutaway portion of the plant to be held very firmly.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A pair of shears comprising blades pivoted together at their inner extremities and provided with cutting edges and operating handles, an auxiliary jaw carried by each of said blades and consisting of an angle plate having a base portion adapted to be adjustably secured upon the face of said blade at different points removed from its cutting edge and an upwardly and inwardly extending portion converging toward the outer extremity of said blade, as and for the purposes specified.

2. A pair of shears comprising flat cutting blades pivoted together at their inner extremities and provided with operating handles, an auxiliary jaw carried by each of said blades and consisting of an angle plate having a base portion adapted to be secured upon the flat face of said blade and an upwardly and inwardly extending portion, the base portion of each of said jaws being provided with spaced parallel slots diagonally arranged across said base, and set screws passing through the slots for adjustably securing said jaw upon its blade.

In testimony whereof, I have signed my name to this specification, in the presence of two subscribing witnesses.

WILLIAM E. HARRIS.

Witnesses:
STELLA L. WASCHENBERGER,
L. W. HOLMES.

Copies of this patent may be obtained for five cents each, by addressing the "Commissioner of Patents, Washington, D. C."